United States Patent
Takashima

(10) Patent No.: US 12,388,621 B2
(45) Date of Patent: Aug. 12, 2025

(54) CRYPTOGRAPHIC SYSTEM, ENCRYPTION DEVICE, DECRYPTION DEVICE, AND KEY GENERATION DEVICE

(71) Applicant: Mitsubishi Electric Corporation, Tokyo (JP)

(72) Inventor: Katsuyuki Takashima, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 289 days.

(21) Appl. No.: 18/163,485

(22) Filed: Feb. 2, 2023

(65) Prior Publication Data

US 2023/0179397 A1 Jun. 8, 2023

Related U.S. Application Data

(63) Continuation of application No. PCT/JP2020/035870, filed on Sep. 23, 2020.

(51) Int. Cl.
*H04L 29/06* (2006.01)
*G06F 21/00* (2013.01)
(Continued)

(52) U.S. Cl.
CPC .......... *H04L 9/0618* (2013.01); *H04L 9/0861* (2013.01); *H04L 9/3066* (2013.01)

(58) Field of Classification Search
CPC ... H04L 9/0618; H04L 9/0861; H04L 9/3066; H04L 9/0841
See application file for complete search history.

(56) References Cited

U.S. PATENT DOCUMENTS

| | | | |
|---|---|---|---|
| 2005/0094806 A1* | 5/2005 | Jao | G06F 7/725 380/30 |
| 2008/0084997 A1* | 4/2008 | Lauter | G06F 7/724 380/30 |

(Continued)

FOREIGN PATENT DOCUMENTS

JP 2002215023 A * 7/2002

OTHER PUBLICATIONS

De Saint Guilhem et al., "SÉTA: Supersingular Encryption from Torsion Attacks", Cryptology ePrint Archive: Report 2019/1291, Feb. 11, 2020, pp. 1-34 (total 35 pages).
(Continued)

*Primary Examiner* — Lisa C Lewis
(74) *Attorney, Agent, or Firm* — Birch, Stewart, Kolasch & Birch, LLP

(57) ABSTRACT

A cryptographic system (1) performs a cryptographic process in which a Richelot isogeny sequence $\varphi_s$ whose starting point is an abelian surface $A_0$ and whose end point is an abelian surface $A_s$ is a secret key and the abelian surface $A_s$ is a public key. An encryption device (28) computes an abelian surface $A_m$ by transitioning the abelian surface $A_s$, which is the public key, by a Richelot isogeny sequence $\varphi_m$ generated by encoding a plaintext m, and sets the abelian surface $A_m$ as a ciphertext. A decryption device (30) computes a Richelot isogeny $\varphi_m$ whose starting point is the abelian surface $A_s$, which is the public key, and whose end point is the abelian surface $A_m$, which is the ciphertext, based on the Richelot isogeny sequence $\varphi_s$, which is the secret key.

15 Claims, 13 Drawing Sheets

(51) Int. Cl.
H04L 9/06 (2006.01)
H04L 9/08 (2006.01)
H04L 9/30 (2006.01)

(56) References Cited

U.S. PATENT DOCUMENTS

2010/0172491 A1* 7/2010 Broker .................. H04L 9/3006
380/28
2020/0259648 A1* 8/2020 Koziel .................. H04L 9/0637
2024/0184699 A1* 6/2024 El Khatib ........... G06F 12/0831

OTHER PUBLICATIONS

International Search Report (PCT/ISA/210) issued in PCT/JP2020/035870, dated Dec. 15, 2020.
Kutas et al., "Weak instances of SIDH variants under improved torsion-point attacks", Cryptology ePrint Archive: Report 2020/633, May 27, 2020, pp. 1-29 (total 30 pages).
Petit, Christophe, "Faster Algorithms for Isogeny Problems using Torsion Point Images", Cryptology ePrint Archive: Report 2017/571, Sep. 14, 2017, pp. 1-23 (total 24 pages).

* cited by examiner

CRYPTOGRAPHIC SYSTEM, ENCRYPTION DEVICE, DECRYPTION DEVICE, AND KEY GENERATION DEVICE

CROSS REFERENCE TO RELATED APPLICATION

This application is a Continuation of PCT International Application No. PCT/JP2020/035870, filed on Sep. 23, 2020, which is hereby expressly incorporated by reference into the present application.

TECHNICAL FIELD

The present disclosure relates to isogeny-based cryptography.

BACKGROUND ART

Isogeny-based cryptography includes types such as supersingular isogeny Diffie-Hellman key exchange (SIDH) and supersingular isogeny key encapsulation (SIKE). In isogeny-based cryptography such as SIDH and SIKE, security cannot be based on the hardness of the basic isogeny problem, and security needs to be based on the hardness of the isogeny problem of the SIDH type, which requires giving an attacker (decrypting party) even additional information that is given as points of an elliptic curve. Therefore, in isogeny-based cryptography of the SIDH type, construction of a scheme whose security is based on the hardness of the basic isogeny problem without additional information has been awaited.

Non-Patent Literature 1 describes a SETA encryption scheme, which is isogeny-based cryptography of the SIDH type whose security is based on the hardness of the basic isogeny problem without additional information.

CITATION LIST

Non-Patent Literature

Non-Patent Literature 1: C. D. S. Guilhem, P. Kutas, C. Petit, J. Silva, SETA: Supersingular Encryption from Torsion Attacks.
Non-Patent Literature 2: C. Petit, Faster Algorithms for Isogeny Problems using Torsion Point Images.

SUMMARY OF INVENTION

Technical Problem

In the SETA encryption scheme, the cryptoanalysis method described in Non-Patent Literature 2 is used for a decryption algorithm. Therefore, decryption requires a great amount of time.

An object of the present disclosure is to reduce the time required for decryption in the SETA encryption scheme.

Solution to Problem

A cryptographic system according to the present disclosure performs a cryptographic process in which a Richelot isogeny sequence $\varphi_s$ whose starting point is an abelian surface $A_0$ and whose end point is an abelian surface $A_s$ is a secret key and the abelian surface $A_s$ is a public key, and the cryptographic system includes an encryption device to compute an abelian surface $A_m$ by transitioning the abelian surface $A_s$, which is the public key, by a Richelot isogeny sequence $\varphi_m$ generated by encoding a plaintext m, and set the abelian surface $A_m$ as a ciphertext; and a decryption device to compute a Richelot isogeny $\varphi_m$ whose starting point is the abelian surface $A_s$, which is the public key, and whose end point is the abelian surface $A_m$, which is the ciphertext, based on the Richelot isogeny sequence $\varphi_s$, which is the secret key.

Advantageous Effects of Invention

In the present disclosure, a Richelot isogeny sequence $\varphi_s$ whose starting point is an abelian surface $A_0$ and whose end point is an abelian surface $A_s$ is used as a secret key, and the abelian surface $A_s$ is used as a public key. This allows the length of a prime number p in the SETA encryption scheme to be reduced to ⅓. As a result, the time required for decryption in the SETA encryption scheme can be reduced.

DESCRIPTION OF EMBODIMENTS

First Embodiment

*Description of Configurations*

Figure 1:
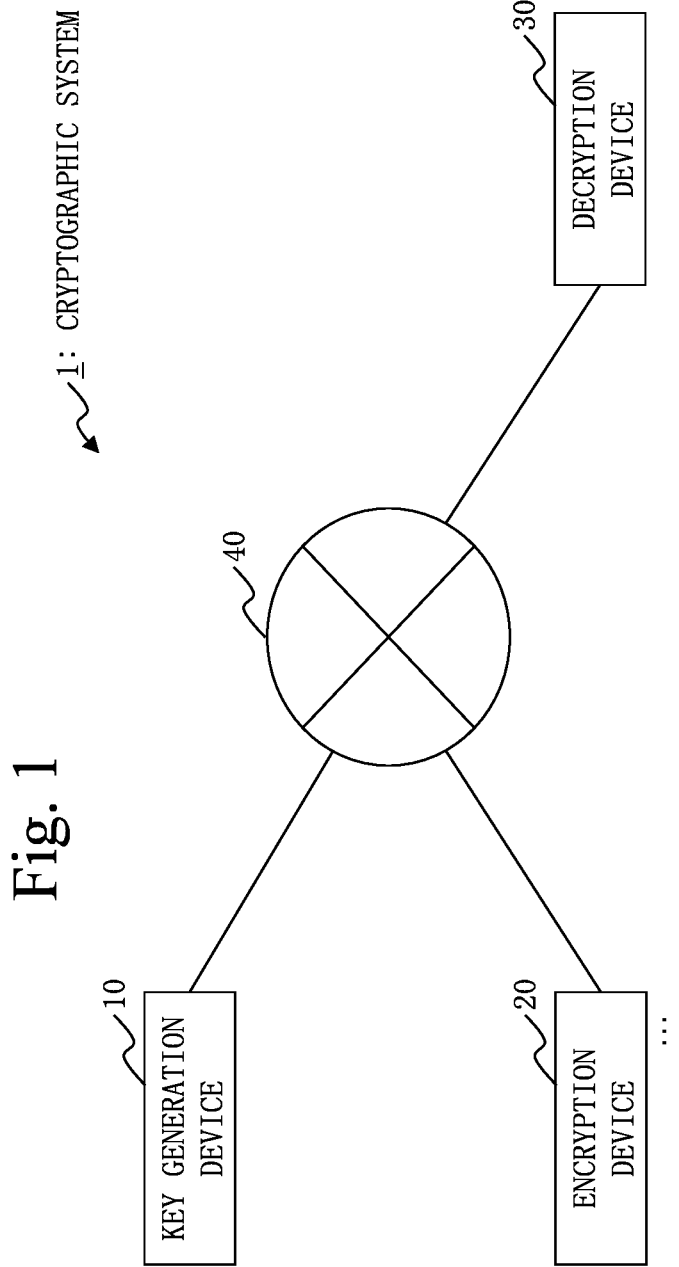
FIG. 1 is a configuration diagram of a cryptographic system 1 according to a first embodiment.

Referring to FIG. 1, a configuration of a cryptographic system 1 according to a first embodiment will be described.

The cryptographic system 1 includes a key generation device 10, an encryption device 20, and a decryption device 30. The key generation device 10, the encryption device 20, and the decryption device 30 are connected via a communication channel 40 such as a local area network (LAN) or the Internet.

Figure 2:
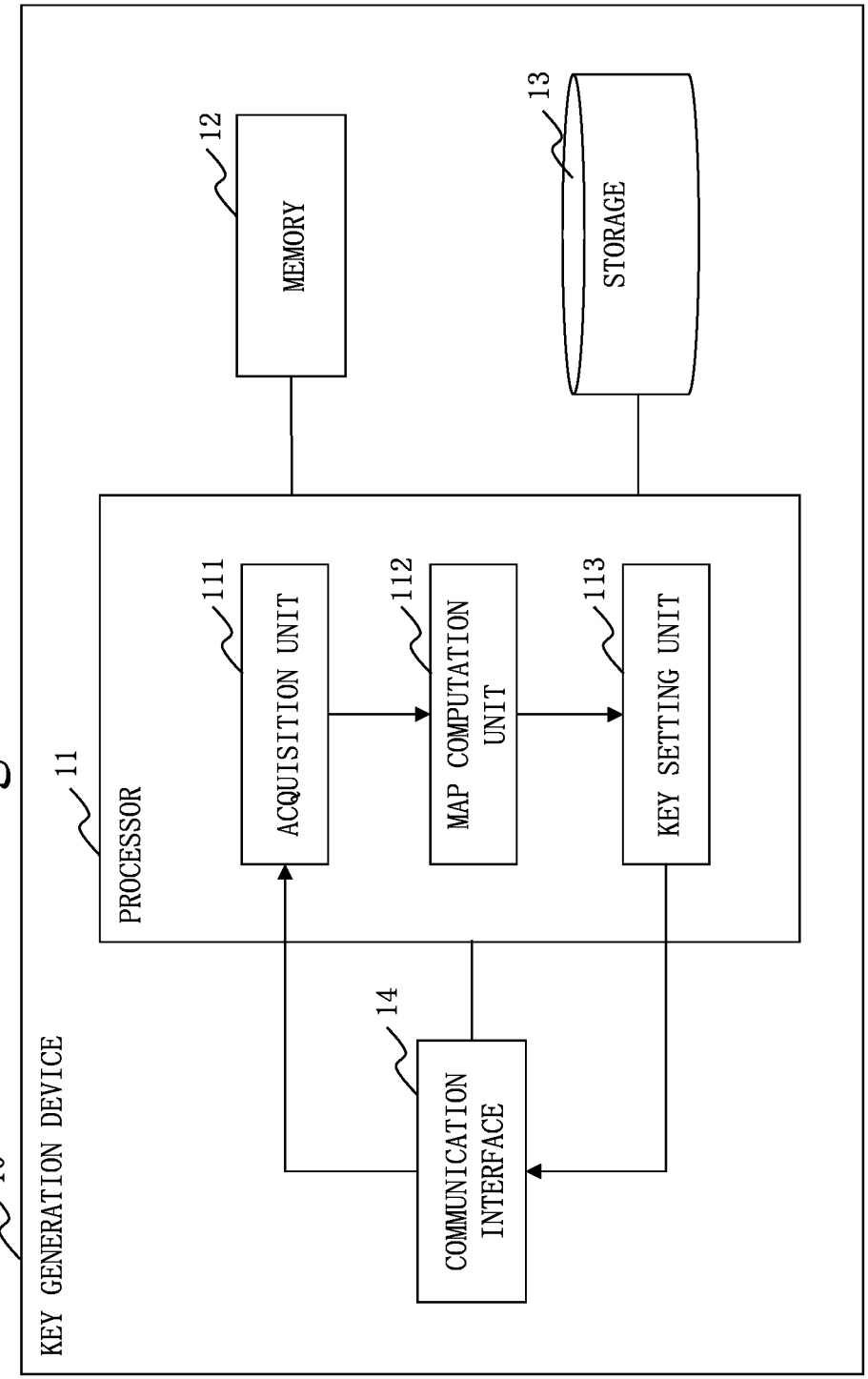
FIG. 2 is a configuration diagram of a key generation device 10 according to the first embodiment.

Referring to FIG. 2, a configuration of the key generation device 10 according to the first embodiment will be described.

The key generation device 10 is a computer.

The key generation device 10 includes hardware of a processor 11, a memory 12, a storage 13, and a communication interface 14. The processor 11 is connected with other hardware components via signal lines and controls these other hardware components.

The key generation device 10 includes, as functional components, an acquisition unit 111, a map computation unit 112, and a key setting unit 113. The functions of the functional components of the key generation device 10 are realized by software.

The storage 13 stores programs that realize the functions of the functional components of the key generation device 10. These programs are read into the memory 12 by the processor 11 and executed by the processor 11. This realizes the functions of the functional components of the key generation device 10.

Figure 3:
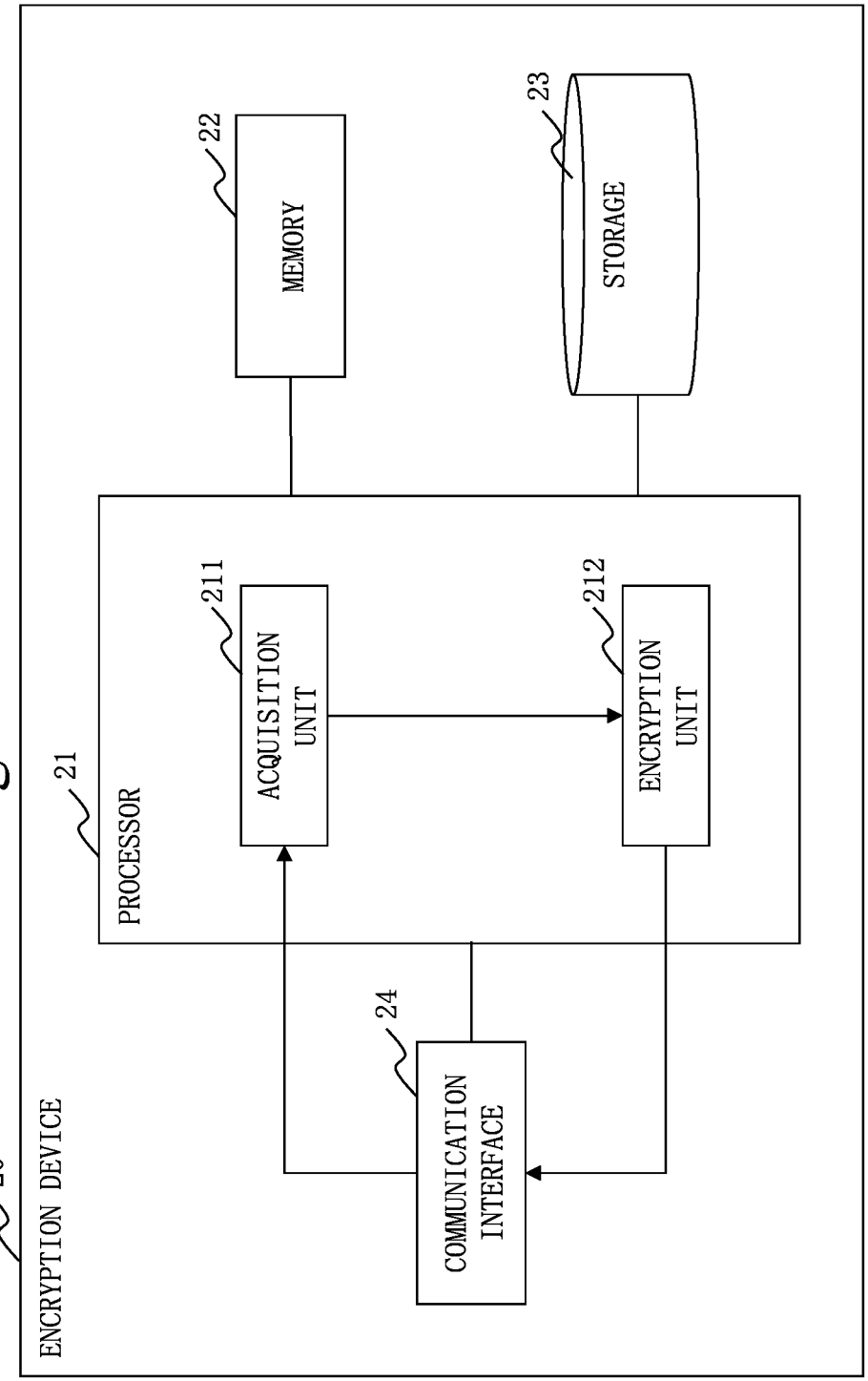
FIG. 3 is a configuration diagram of an encryption device 20 according to the first embodiment.

Referring to FIG. 3, a configuration of the encryption device 20 according to the first embodiment will be described.

The encryption device 20 is a computer.

The encryption device 20 includes hardware of a processor 21, a memory 22, a storage 23, and a communication interface 24. The processor 21 is connected with other hardware components via signal lines and controls these other hardware components.

The encryption device 20 includes, as functional components, an acquisition unit 211 and an encryption unit 212. The functions of the functional components of the encryption device 20 are realized by software.

The storage 23 stores programs that realize the functions of the functional components of the encryption device 20. These programs are read into the memory 22 by the processor 21 and executed by the processor 21. This realizes the functions of the functional components of the encryption device 20.

Figure 4:
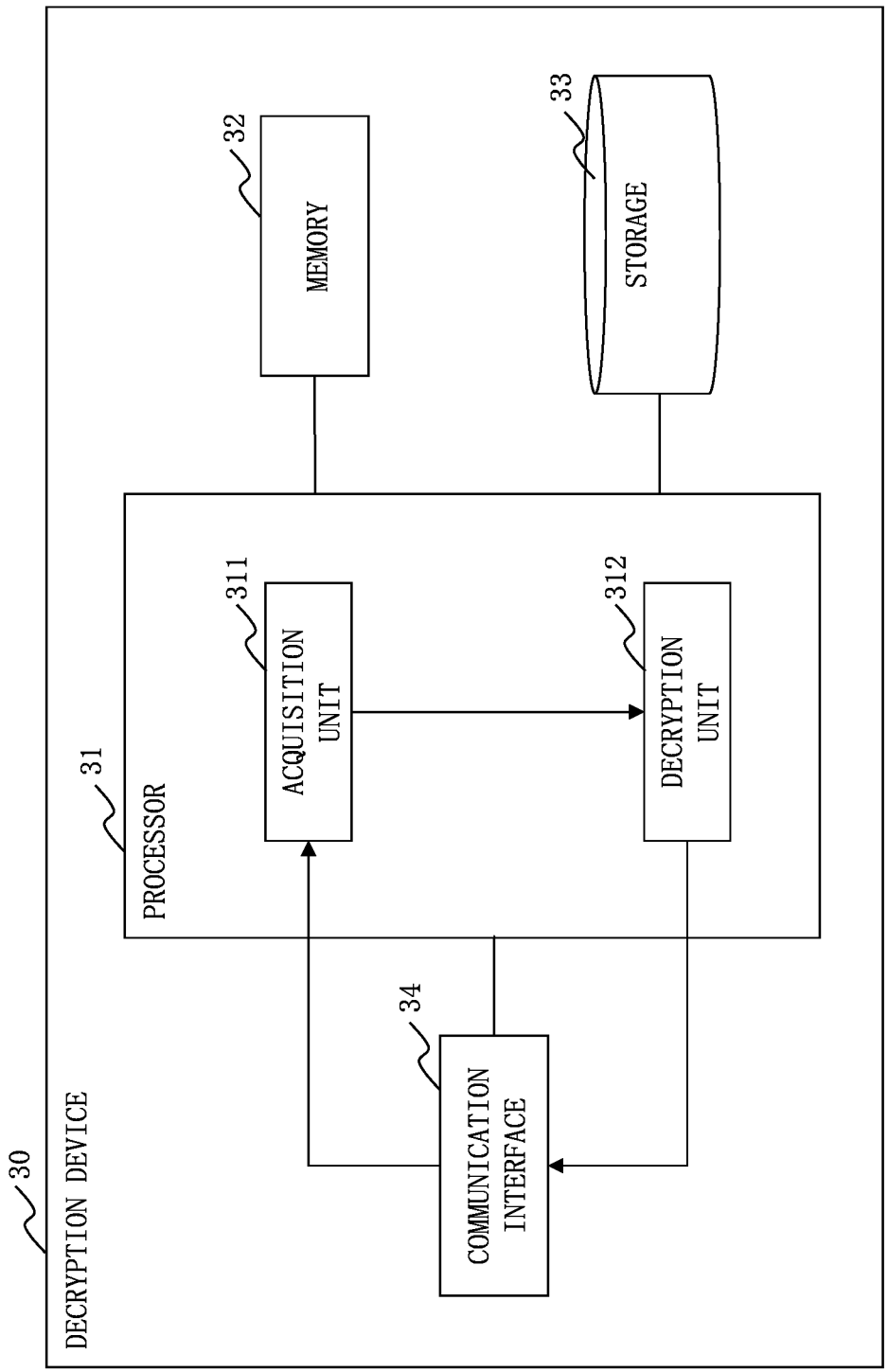
FIG. 4 is a configuration diagram of a decryption device 30 according to the first embodiment.

Referring to FIG. 4, a configuration of the decryption device 30 according to the first embodiment will be described.

The decryption device 30 is a computer.

The decryption device 30 includes hardware of a processor 31, a memory 32, a storage 33, and a communication interface 34. The processor 31 is connected with other hardware components via signal lines and controls these other hardware components.

The decryption device 30 includes, as functional components, an acquisition unit 311 and a decryption unit 312. The functions of the functional components of the decryption device 30 are realized by software.

The storage 33 stores programs that realize the functions of the functional components of the decryption device 30. These programs are read into the memory 32 by the processor 31 and executed by the processor 31. This realizes the functions of the functional components of the decryption device 30.

Each of the processors 11, 21, and 31 is an integrated circuit (IC) that performs processing. Specific examples of each of the processors 11, 21, and 31 are a central processing unit (CPU), a digital signal processor (DSP), and a graphics processing unit (GPU).

Each of the memories 12, 22, and 32 is a storage device to temporarily store data. Specific examples of each of the memories 12, 22, and 32 are a static random access memory (SRAM) and a dynamic random access memory (DRAM).

Each of the storages 13, 23, and 33 is a storage device to store data. A specific example of each of the storages 13, 23, and 33 is a hard disk drive (HDD). Each of the storages 13, 23, and 33 may be a portable recording medium such as a Secure Digital (SD, registered trademark) memory card, CompactFlash (CF, registered trademark), a NAND flash, a flexible disk, an optical disc, a compact disc, a Blu-ray (registered trademark) disc, or a digital versatile disc (DVD).

Each of the communication interfaces 14, 24, and 34 is an interface for communicating with external devices. Specific examples of each of the communication interfaces 14, 24, and 34 are an Ethernet (registered trademark) port, a Universal Serial Bus (USB) port, and a High-Definition Multimedia Interface (HDMI, registered trademark) port.

FIG. 2 illustrates only one processor 11. However, there may be a plurality of processors 11, and the plurality of processors 11 may cooperatively execute the programs that realize the functions. Similarly, there may be a plurality of processors 21 and a plurality of processors 31.

\*\*\*Description of Operation\*\*\*

Referring to FIGS. 5 to 10, operation of the cryptographic system 1 according to the first embodiment will be described.

A procedure for the operation of the cryptographic system 1 according to the first embodiment is equivalent to a cryptographic process according to the first embodiment. A program that realizes the operation the cryptographic system 1 according to the first embodiment is equivalent to a cryptographic program according to the first embodiment.

\*\*Description of Concept\*\*

A concept that is the basis of a cryptographic scheme realized by the cryptographic system 1 according to the first embodiment will be described.

In Non-Patent Literature 1, elliptic curves are used. The cryptographic system 1 uses genus-2 curves in place of elliptic curves.

A genus-2 curve used by the cryptographic system 1 is an algebraic curve indicated in Formula 11, where a degree deg(f(X)) is 5 or 6.

$$C: Y^2 = f(X) \quad \text{[Formula 11]}$$

As indicated in Formula 12, it is assumed that genus-2 curves are transitioned with a genus-2 curve $C_0$ as the starting point and a genus-2 curve $C_\kappa$ as the end point by repeating Richelot isogenies κ times, where κ is an integer of 2 or more.

$$C_0 \xrightarrow{\varphi_0} C_1 \xrightarrow{\varphi_1} \ldots \xrightarrow{\varphi_{\kappa-2}} C_{\kappa-1} \xrightarrow{\varphi_{\kappa-1}} C_\kappa \quad \text{[Formula 12]}$$

As the basic problem concerning cryptographic security, the cryptographic system 1 uses finding (computing) a Richelot isogeny sequence $\varphi_0, \varphi_1, \ldots, \varphi_{\kappa-1}$ that interpolates the genus-2 curves $C_0$ and $C_\kappa$ when two genus-2 curves of the genus-2 curves $C_0$ and $C_\kappa$ are given. The cryptographic system 1 constructs genus-2 SETA cryptography that is based on the hardness of this basic problem.

Each genus-2 curve is expressed using three polynomials $G_j(X)$ with $\deg(G_j(X)) \leq 2$, as indicated in Formula 13. Note that $\deg(G_j(X))$ is the degree of a polynomial $G_j(X)$.

$$C: Y^2 = f(X) = d\Pi_{j=0}^{2} G_j(X) \quad \text{[Formula 13]}$$

Three new polynomials $G^\sim_j(X)$ are defined as indicated in Formula 14.

$$[G_{j+1}(X), G_{j+2}(X)] := G'_{j+1}(X)G_{j+2}(X) - G'_{j+2}(X)G_{j+1}(X),$$
$$\tilde{G}_j(X) := \tau_j^{-1}[G_{j+1}(X), G_{j+2}(X)] \quad \text{[Formula 14]}$$

Note that $\tau_j$ is the highest-degree coefficient of $[G_{j+1}(X), G_{j+2}(X)]$. Therefore, $G^\sim_j(X)$ is a polynomial whose highest-degree coefficient is 1. $G'_{j+1}(X)$ is a derivative of $G_{j+1}(X)$ and $G'_{j+2}(X)$ is a derivative of $G_{j+2}(X)$. Indices are assigned on the assumption that the three polynomials $G_j$ are treated as a permutation such that $G_{j+1}(X)$ when j=0 is $G_1(X)$, $G_{j+1}(X)$ when j=1 is $G_2(X)$, $G_{j+1}(X)$ when j=2 is $G_0(X)$. Similarly, $G_{j+2}(X)$ when j=0 is $G_2(X)$, $G_{j+2}(X)$ when j=1 is $G_0(X)$, and $G_{j+2}(X)$ when j=2 is $G_1(X)$.

A new genus-2 curve $\tilde{C}$ is defined as indicated in Formula 15.

$$\tilde{C}: Y^2 = \tilde{f}(X) = \tilde{d}\Pi_{j=0}^{2} \tilde{G}_j(X) \quad \text{[Formula 15]}$$

with $\tilde{d} = d \cdot \tau_0 \tau_1 \tau_2 \cdot \det((g_{j,k})_{0 \leq j, k \leq 2})^{-1}$ A correspondence (mapping) from the genus-2 curve C to the genus-2 curve $\tilde{C}$ is called a Richelot isogeny. The Richelot isogeny from the genus-2 curve C is determined based on a division $(G_0(X), G_1(X), G_2(X))$ of f(X). This corresponds to a division of zero points of f(X) into three pairs $(a_0, a_1)$, $(a_2, a_3)$, and $(a_4, a_5)$. Note that g will be described later.

Description of a Method of Computing a Genus-2 Curve Sequence

The cryptographic system 1 computes a genus-2 curve sequence $C_0, \ldots, C_\kappa$ by repeating Richelot isogenies from a genus-2 curve $C_0$. However, computing a Richelot isogeny based on three polynomials $\tilde{G}_j(X)$ will revert to the genus-2 curve C. Therefore, the cryptographic system 1 computes a Richelot isogeny once, then rearranges each root (zero point) of each polynomial $\tilde{G}_j(X)$ for a change into three new polynomials, and then computes a Richelot isogeny.

Figure 5:
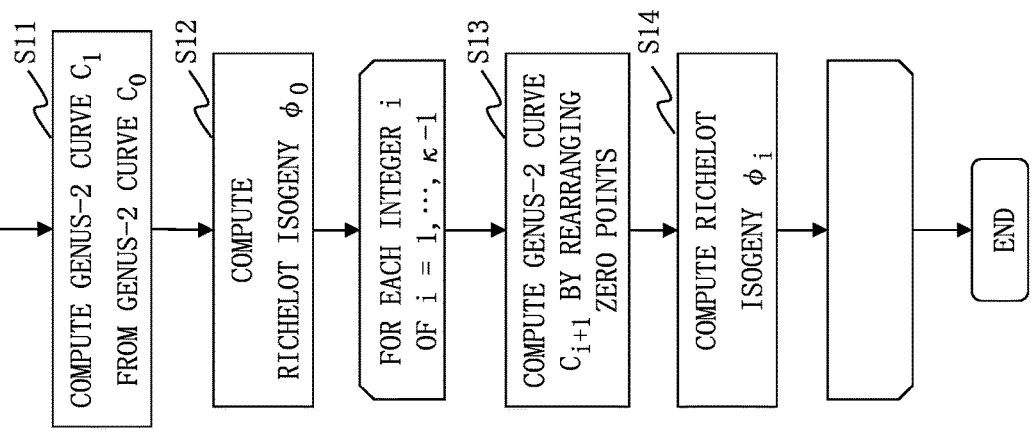
FIG. 5 is a flowchart of a process of computing a genus-2 curve sequence $C_0, \ldots, C_K$ according to the first embodiment.

Referring to FIG. 5, a process of computing the genus-2 curve sequence $C_0, \ldots, C_\kappa$ according to the first embodiment will be described.

A genus-2 curve $C_i$ is defined as indicated in Formula 16.

$$C_i / \mathbb{F}_p : Y^2 = f_i(X) = d \prod_{j=0}^{2} G_{i,j}(X) \text{ where} \quad \text{[Formula 16]}$$

$$G_{i,j} = \sum_{k=0}^{2} g_{i,j,k} X^k$$

$$= \begin{cases} (X - a_{i,2j})(X - a_{i,2j+1}) & \text{if } \deg(G_{i,j}) = 2 \\ X - a_{i,2j} \text{ or } X - a_{i,2j+1} & \text{if } \deg(G_{i,j}) = 1 \end{cases}$$

In step S11, three new polynomials $(G_{i,j}(X))_{j=0,1,2}$ are generated from the genus-2 curve $C_0$ in accordance with Formula 14. By this, a genus-2 curve $C_1$ is computed.

In step S12, as indicated in Formula 17, three polynomials $\tilde{G}_{1,j}$ are computed to compute a Richelot isogeny $\varphi_0$. Note that $\tau_{0,j}$ is the highest-degree coefficient of $[G_{0,j+1}(X), G_{0,j+2}(X)]$.

$$\tilde{G}_{1,j}(X) := \tau_{0,j}^{-1} [G_{0,j+1}(X), G_{0,j+2}(X)] \text{ for } j=0,1,2 \quad \text{[Formula 17]}$$

Then, processes of step S13 and step S14 are performed for each integer i of i=1, ..., κ−1 in ascending order.

In step S13, zero points $(a_{i,m})_{m=0,\ldots,5}$ of $f_i(X)$ are rearranged. Then, three new polynomials $(G_{i,j}(X))_{j=0,1,2}$ are generated in accordance with Formula 14. By this, a genus-2 curve $C_{i+1}$ is computed.

In step S14, as indicated in Formula 18, three polynomials $\tilde{G}_{i+1,j}$ are computed to compute a Richelot isogeny $\varphi_i$. Note that $\tau_{i,j}$ is the highest-degree coefficient of $[G_{i,j+1}(X), G_{i,j+2}(X)]$.

$$\tilde{G}_{i+1,j}(X) := \tau_{i,j}^{-1} [G_{i,j+1}(X), G_{i,j+2}(X)] \text{ for } j=0,1,2 \quad \text{[Formula 18]}$$

SETA Encryption Scheme

Figure 6:
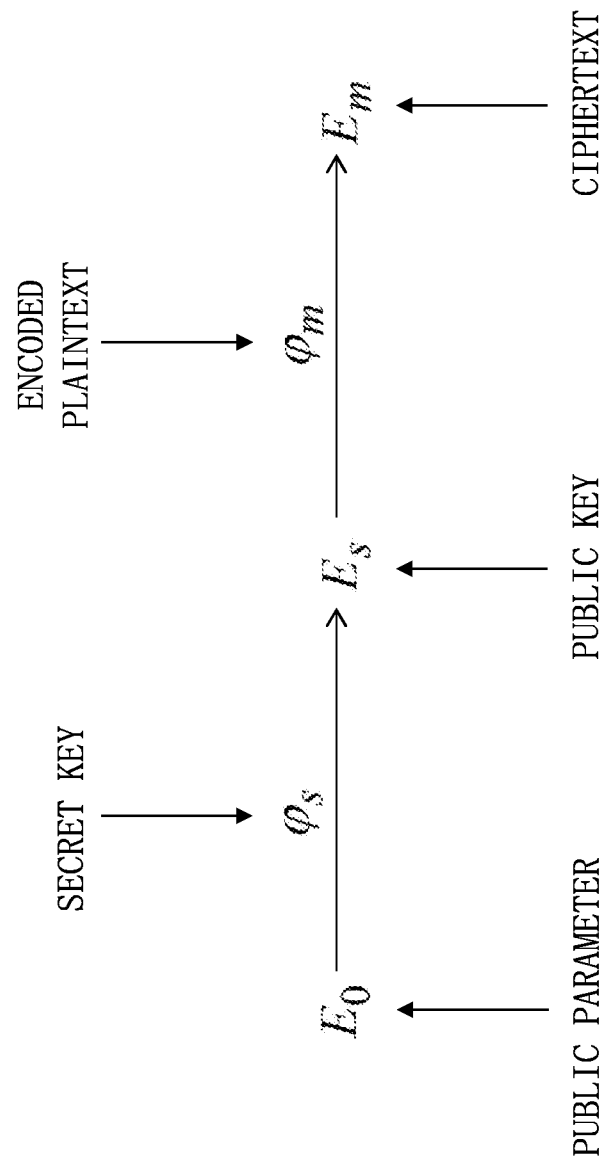
FIG. 6 is a diagram explaining a SETA encryption scheme.

Referring to FIG. 6, a SETA encryption scheme described in Non-Patent Literature 1 will be described.

In the SETA encryption scheme, elliptic curves $E_0$, $E_s$, and $E_m$ are used. The elliptic curve $E_0$ is a public parameter. The elliptic curve $E_0$ is a special curve whose endomorphism ring is easy.

<Key Generation Process>

First, an isogeny sequence $\varphi_s$, which is a secret key, is generated. Then, the elliptic curve $E_0$ is transitioned by the isogeny sequence $\varphi_s$ to calculate an elliptic curve $E_s$, and the elliptic curve $E_s$ is set as a public key.

<Encryption Process>

First, a plaintext m is suitably encoded and transformed into an isogeny sequence $\varphi_m$. Then, the elliptic curve $E_s$, which is the public key, is transitioned by the isogeny sequence $\varphi_m$ to compute an elliptic curve $E_m$. The elliptic curve $E_m$ is set as a ciphertext.

<Decryption Process>

An endomorphism ring of the elliptic curve $E_s$ can be computed through computing an endomorphism ring of the elliptic curve $E_0$, using the isogeny sequence $\varphi_s$, which is the secret key. Therefore, an isogeny problem in which the elliptic curve $E_s$ is the starting point and the elliptic curve $E_m$ is the end point can be solved in polynomial time, and the isogeny sequence $\varphi_m$ can be obtained. The plaintext m is computed from the isogeny sequence $\varphi_m$ by performing a decode operation, which is the inverse operation of an encode operation at the time of encryption.

The point of decryption is that a user who knows the isogeny sequence $\varphi_s$, which is the secret key, can reduce computing the endomorphism ring of the elliptic curve $E_s$ to computing the endomorphism ring of the elliptic curve $E_0$ through the isogeny sequence $\varphi_s$.

Genus-2 SETA Cryptographic Scheme

Referring to FIGS. 7 to 10, a genus-2 SETA cryptographic scheme that is realized by the cryptographic system 1 according to the first embodiment will be described.

Figure 7:
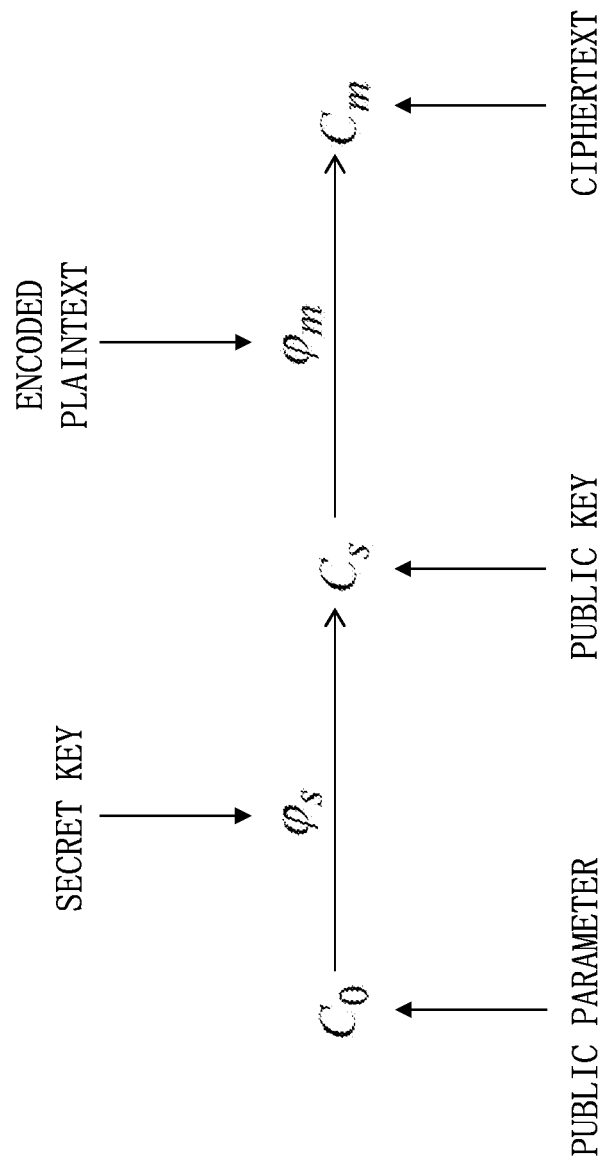
FIG. 7 is a diagram explaining a genus-2 SETA cryptographic scheme according to the first embodiment.

As indicated in FIG. 7, the genus-2 SETA cryptographic scheme is realized by replacing elliptic curves $E_0$, $E_s$, and $E_m$ in the SETA encryption scheme with genus-2 curves $C_0$, $C_s$, and $C_m$, respectively, and replacing isogeny sequences $\varphi_s$ and $\varphi_m$ with Richelot isogeny sequences $\varphi_s$ and $\varphi_m$, respectively.

Figure 8:
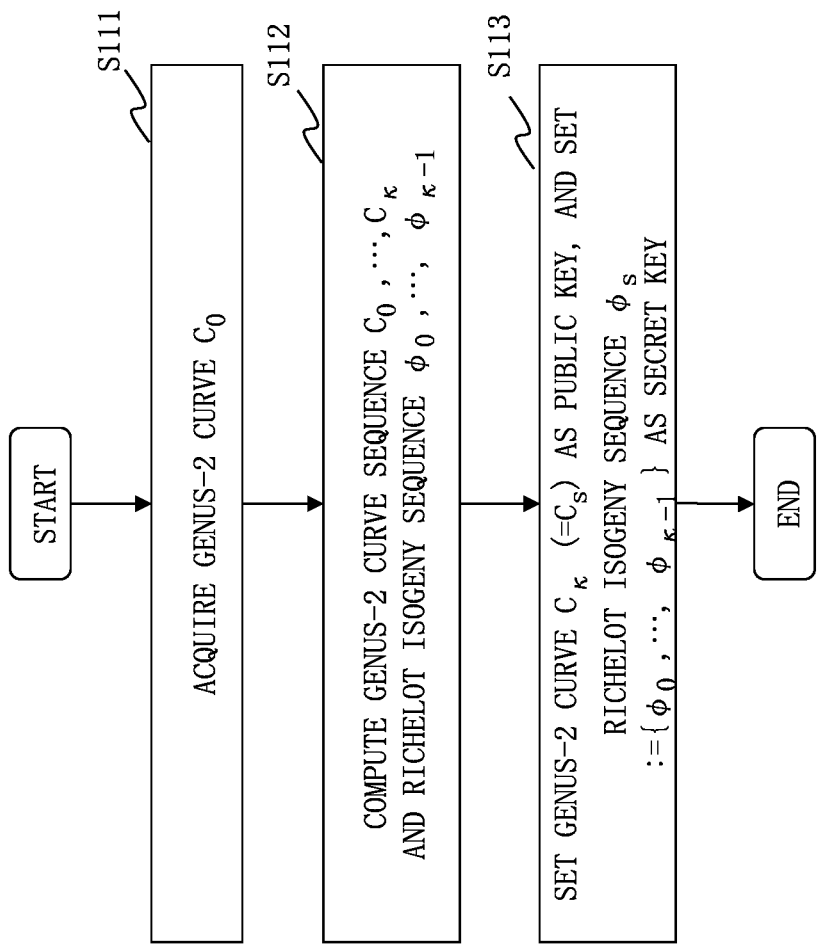
FIG. 8 is a flowchart illustrating operation of the key generation device 10 according to the first embodiment.

Referring to FIG. 8, operation of the key generation device 10 according to the first embodiment will be described.

A procedure for the operation of the key generation device 10 according to the first embodiment is equivalent to a key generation method according to the first embodiment. A program that realizes the operation of the key generation device 10 according to the first embodiment is equivalent to a key generation program according to the first embodiment.

(Step S111: Acquisition Process)

The acquisition unit 111 acquires a genus-2 curve $C_0$, which is a public parameter.

The acquisition unit 111 writes the genus-2 curve $C_0$ in the memory 12.

(Step S112: Map Computation Process)

The map computation unit 112 computes a Richelot isogeny $\varphi_m$ of the genus-2 curve $C_0$ acquired in step S111 to compute a genus-2 curve $C_1$. The map computation unit 112 computes a Richelot isogeny $\varphi_i$ to compute a genus-2 curve $C_{i+1}$ by rearranging zero points of a genus-2 curve $C_i$ for each integer i of i=1, ..., κ−1 in ascending order, using an integer κ of 2 or more.

Specifically, the map computation unit 112 computes a genus-2 curve sequence $C_0, \ldots, C_\kappa$ and a Richelot isogeny sequence $\varphi_0, \ldots, \varphi_{\kappa-1}$ by performing the process of computing of the genus-2 curve sequence $C_0, \ldots, C_K$ described with reference to FIG. 5.

The map computation unit 112 writes the genus-2 curve sequence $C_0, \ldots, C_K$ and the Richelot isogeny sequence $\varphi_0, \ldots, \varphi_{K-1}$ in the memory 12.

(Step S113: Key Setting Process)

The key setting unit 113 sets the genus-2 curve $C_K$ computed in step S112 as a genus-2 curve $C_s$ as a public key. The key setting unit 113 sets the Richelot isogeny sequence $\varphi_s := \{\varphi_0, \ldots, \varphi_{K-1}\}$ computed in step S112 as a secret key. That is, the Richelot isogeny sequence $\varphi_s$ whose starting point is the genus-2 curve $C_0$ and whose end point is the genus-2 curve $C_s$ is set as the secret key.

The key setting unit 113 transmits the public key to the encryption device 20 and the decryption device 30 via the communication interface 14. The key setting unit 113 transmits the secret key in secrecy to the decryption device 30 via the communication interface 14. To transmit in secrecy means, for example, to transmit after encryption using an existing encryption scheme.

The secret key is the Richelot isogeny sequence $\varphi_s$. Substantially, this means that a method of permutations $\sigma_0, \ldots, \sigma_{K-1}$, which is how roots are rearranged in the process of step 13 in the process of computing the genus-2 curve sequence $C_0, \ldots, C_K$, corresponds to the secret key.

Figure 9:
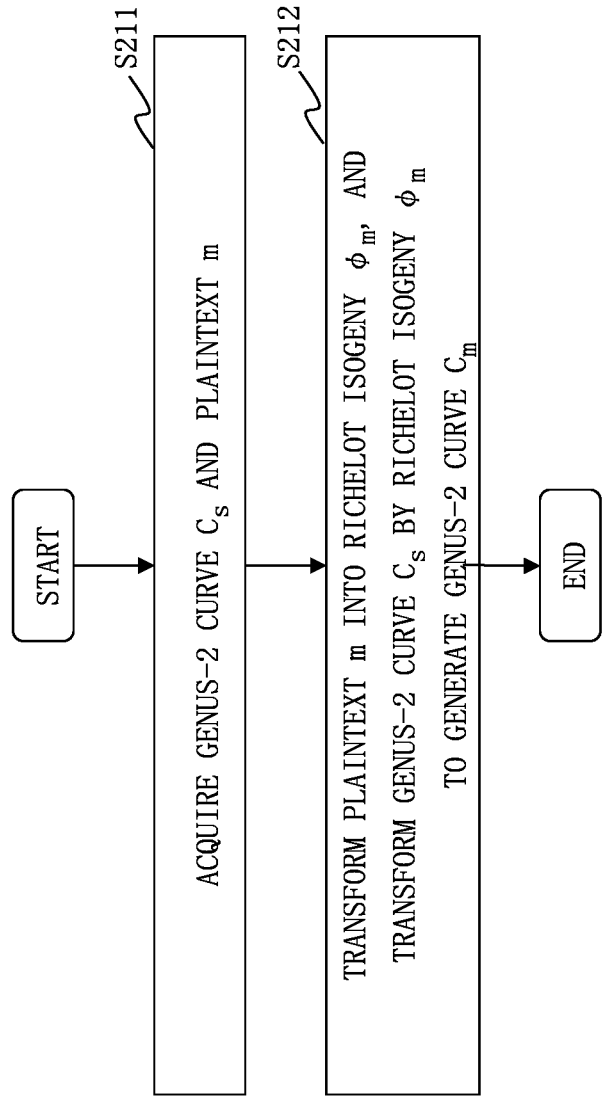
FIG. 9 is a flowchart illustrating operation of the encryption device 20 according to the first embodiment.

Referring to FIG. 9, operation of the encryption device 20 according to the first embodiment will be described.

A procedure for the operation of the encryption device 20 according to the first embodiment is equivalent to an encryption method according to the first embodiment. A program that realizes the operation of the encryption device 20 according to the first embodiment is equivalent to an encryption program according to the first embodiment.

(Step S211: Acquisition Process)

The acquisition unit 211 acquires the genus-2 curve $C_s$, which is the public key generated by the key generation device 10. The acquisition unit 211 acquires a plaintext m. The plaintext m is input by a user of the encryption device 20.

The acquisition unit 211 writes the genus-2 curve $C_s$ and the plaintext m in the memory 22.

(Step S212: Encryption Process)

The encryption unit 212 encodes the plaintext m acquired in step S211 to transform the plaintext m into a Richelot isogeny sequence $\varphi_m$. The encryption unit 212 transitions the genus-2 curve $C_s$, which is the public key, acquired in step S211 by the Richelot isogeny sequence $\varphi_m$ to compute a genus-2 curve $C_m$. Then, the encryption unit 212 sets the genus-2 curve $C_m$ as a ciphertext.

The encryption unit 212 transmits the ciphertext to the decryption device 30 via the communication interface 24.

Figure 10:
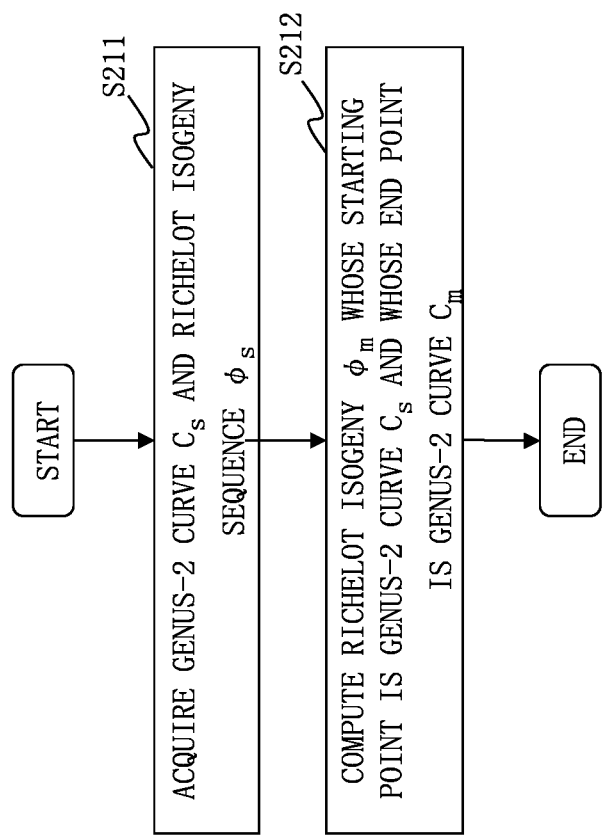
FIG. 10 is a flowchart illustrating operation of the decryption device 30 according to the first embodiment.

Referring to FIG. 10, operation of the decryption device 30 according to the first embodiment will be described.

A procedure for the operation of the decryption device 30 according to the first embodiment is equivalent to a decryption method according to the first embodiment. A program that realizes the operation of the decryption device 30 according to the first embodiment is equivalent to a decryption program according to the first embodiment.

(Step S311: Acquisition Process)

The acquisition unit 311 acquires the public parameter, and acquires the public key and the secret key generated by the key generation device 10. The acquisition unit 311 acquires the ciphertext generated by the encryption device 20.

The acquisition unit 311 writes the public parameter, the public key, the secret key, and the ciphertext in the memory 32.

(Step S312: Decryption Process)

The decryption unit 312 computes a Richelot isogeny $\varphi_m$ whose starting point is the genus-2 curve $C_s$, which is the public key, acquired in step S311, and whose end point is the genus-2 curve $C_m$, which is the ciphertext, acquired in step S311, based on the Richelot isogeny sequence $\varphi_s$, which is the secret key, and the genus-2 curve $C_0$, which is the public key, acquired in step S311. Then, the decryption unit 312 decodes the Richelot isogeny $\varphi_m$ to compute a plaintext m'=m. This decoding is the inverse operation of the encoding performed in step S212.

The decryption unit 312 outputs the plaintext m' via the communication interface 14.

Effects of the First Embodiment

As described above, the cryptographic system 1 according to the first embodiment realizes the genus-2 SETA cryptographic scheme by replacing the elliptic curves $E_0$, $E_s$, and $E_m$ in the SETA encryption scheme with the genus-2 curves $C_0$, $C_s$, and $C_m$, and replacing the isogeny sequences $\varphi_s$ and $\varphi_m$ with the Richelot isogeny sequences $\varphi_s$ and $\varphi_m$.

In the genus-2 SETA cryptographic scheme, the value of the prime number p used in the SETA encryption scheme can be reduced to ⅓. As a result, the time required for decryption can be reduced.

*Other Configurations*

<First Variation>

In the first embodiment, the case where the genus-2 curves $C_0$, $C_s$, and $C_m$ are used has been described. However, the genus-2 curves $C_0$, $C_s$, and $C_m$ used by the cryptographic system 1 according to the first embodiment can be interpreted as abelian surfaces $A_0$, $A_s$, and $A_m$. That is, a cryptographic scheme having substantially the same effects as those of the genus-2 SETA cryptographic scheme can be realized by replacing the elliptic curves $E_0$, $E_s$, and $E_m$ in the SETA encryption scheme with the abelian surfaces $A_0$, $A_s$, and $A_m$, respectively, and replacing the isogeny sequences $\varphi_s$ and $\varphi_m$ with the Richelot isogeny sequences $\varphi_s$ and $\varphi_m$, respectively.

When a genus-2 curve is used as in the first embodiment, it is desirable that the genus-2 curve be the genus-2 curve corresponding to a portion adjacent to a portion decomposed into the direct product of the elliptic curve $E_0$ out of portions not decomposed into the direct product of the elliptic curve $E_0$ in the abelian surface.

When a genus-2 curve is not used, it is desirable that a portion decomposed into the direct product of the elliptic curve be used.

The elliptic curve $E_0$ used in the direct product of the elliptic curve that decomposes the abelian surface is $E_0/F_p$: $y^2=x^3+x$ when the remainder of dividing the prime number p by 4 is 3, or $E_0/F_p$: $y^2=x^3+c$ when the remainder of dividing the prime number p by 4 is 1, where c is a constant. Note that $F_p$ is a field modulo the prime number p.

<Second Variation>

In the first embodiment, the functional components are realized by software. As a second variation, the functional components may be realized by hardware. With regard to this second variation, differences from the first embodiment will be described.

Figure 11:
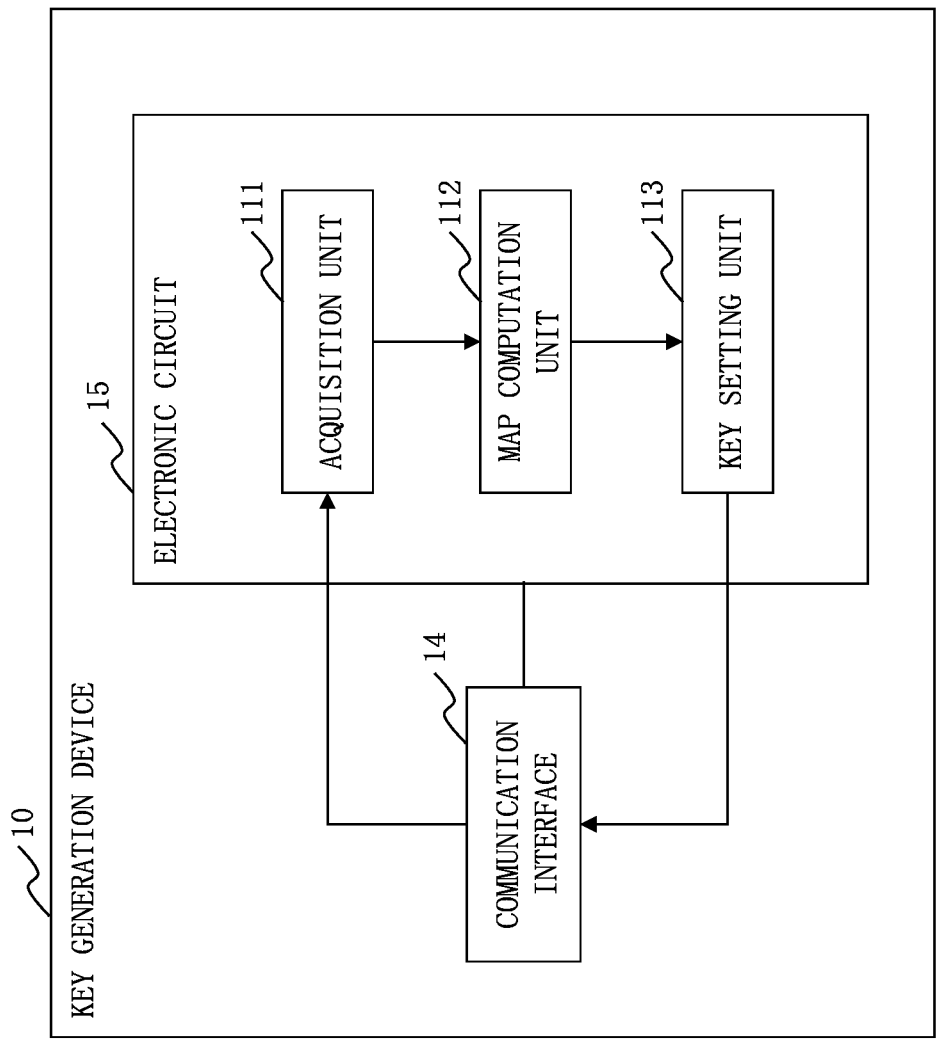
FIG. 11 is a configuration diagram of the key generation device 10 according to a first variation.

Referring to FIG. 11, a configuration of the key generation device 10 according to the second variation will be described.

When the functional components are realized by hardware, the key generation device 10 includes an electronic circuit 15 in place of the processor 11, the memory 12, and the storage 13. The electronic circuit 15 is a dedicated circuit that realizes the functions of the functional components, the memory 12, and the storage 13.

Figure 12:
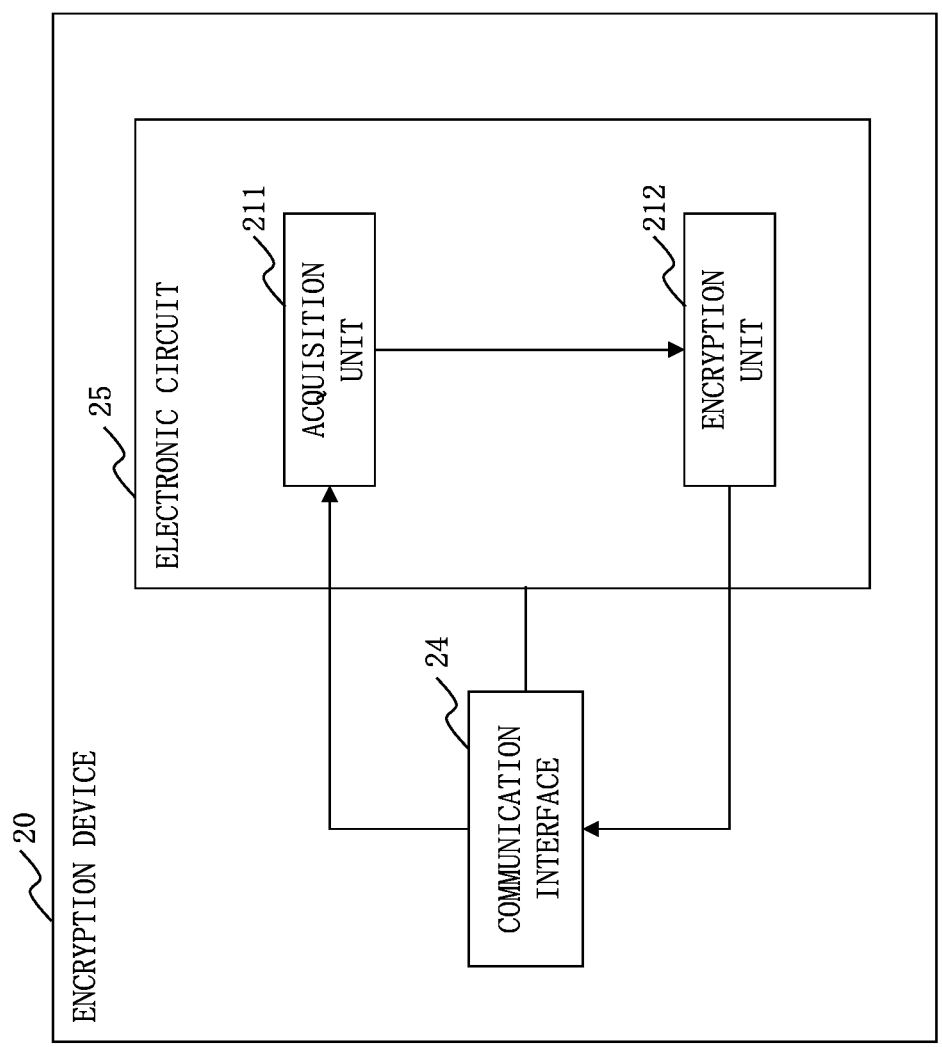
FIG. 12 is a configuration diagram of the encryption device 20 according to the first variation.

Referring to FIG. 12, a configuration of the encryption device 20 according to the second variation will be described.

When the functional components are realized by hardware, the encryption device 20 includes an electronic circuit 25 in place of the processor 21, the memory 22, and the storage 23. The electronic circuit 25 is a dedicated circuit that realizes the functions of the functional components, the memory 22, and the storage 23.

Figure 13:
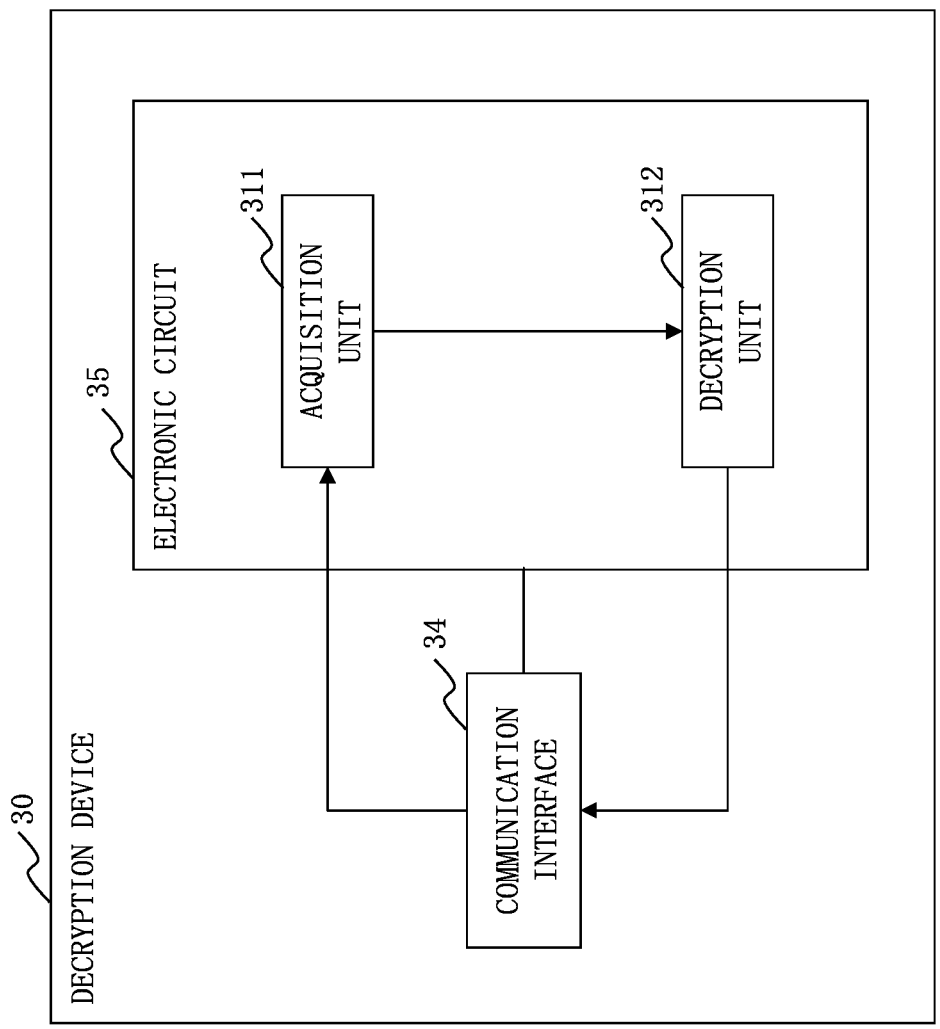
FIG. 13 is a configuration diagram of the decryption device 30 according to the first variation.

Referring to FIG. 13, a configuration of the decryption device 30 according to the second variation will be described.

When the functional components are realized by hardware, the decryption device 30 includes an electronic circuit 35 in place of the processor 31, the memory 32, and the storage 33. The electronic circuit 35 is a dedicated circuit that realizes the functions of the functional components, the memory 32, and the storage 33.

Each of the electronic circuits 15, 25, and 35 is assumed to be a single circuit, a composite circuit, a programmed processor, a parallel-programmed processor, a logic IC, a gate array (GA), an application specific integrated circuit (ASIC), or a field-programmable gate array (FPGA).

The functional components may be realized by one electronic circuit 15, one electronic circuit 25, and one electronic circuit 35, or the functional components may be distributed among and realized by a plurality of electronic circuits 15, a plurality of electronic circuits 25, and a plurality of electronic circuits 35.

<Third Variation>

As a third variation, some of the functional components may be realized by hardware, and the rest of the functional components may be realized by software.

Each of the processors 11, 21, 31, the memories 12, 22, 32, the storages 13, 23, 33, the electronic circuits 15, 25, and 35 is referred to as processing circuitry. That is, the functions of the functional components are realized by the processing circuitry.

The embodiment and variations of the present disclosure have been described above. Two or more of these embodiment and variations may be implemented in combination. Alternatively, one or more of them may be partially implemented. The present disclosure is not limited to the above embodiment and variations, and various modifications can be made as needed.

REFERENCE SIGNS LIST

1: cryptographic system, 10: key generation device, 11: processor, 12: memory, 13: storage, 14: communication interface, 15: electronic circuit, 111: acquisition unit, 112: map computation unit, 113: key setting unit, 20: encryption device, 21: processor, 22: memory, 23: storage, 24: communication interface, 25: electronic circuit, 211: acquisition unit, 212: encryption unit, 30: decryption device, 31: processor, 32: memory, 33: storage, 34: communication interface, 35: electronic circuit, 311: acquisition unit, 312: decryption unit.

The invention claimed is:

1. A cryptographic system to perform a cryptographic process in which a Richelot isogeny sequence $\varphi_s$ includes a first starting point and a first end point, the first starting point being an abelian surface $A_0$ and the first end point being an abelian surface $A_s$, the abelian surface $A_0$ being a first secret key and the abelian surface $A_s$ being a first public key, the cryptographic system comprising:
processing circuitry configured to:
compute an abelian surface $A_m$ by transitioning the abelian surface $A_s$, which is the first public key, by a Richelot isogeny sequence $\varphi_m$ generated by encoding a plaintext m, and set the abelian surface $A_m$ as a ciphertext; and
compute a Richelot isogeny $\varphi_m$ with a second start point and a second end point, the second starting point being the abelian surface $A_s$, the abelian surface $A_s$ being a second public key, and the second end point is the abelian surface $A_m$, the abelian surface $A_m$ being the ciphertext, based on the Richelot isogeny sequence $\varphi_s$, the Richelot isogeny sequence $\varphi_s$ bring a second secret key.

2. The cryptographic system according to claim 1, wherein the processing circuitry is further configured to:
compute a Richelot isogeny $\varphi_0$ of an abelian surface $A_0$ to compute an abelian surface $A_1$, compute a Richelot isogeny $\varphi_i$ to compute an abelian surface $A_{i+1}$ by rearranging zero points of the abelian surface $A_i$ for each integer i of i=1, ..., κ−1 in ascending order, using an integer κ of 2 or more, set the abelian surface $A_s$ that is an abelian surface $A_κ$ as a third public key, and set the Richelot isogeny sequence $\varphi_s$ that is a set of Richelot isogenies $\varphi_i$ for integers i of i=0, ..., κ−1 as a third secret key.

3. The cryptographic system according to claim 1, wherein the processing circuity is configured to use, as the abelian surface $A_0$, a genus-2 curve corresponding to the abelian surface $A_0$.

4. The cryptographic system according to claim 2, wherein the processing circuitry is configured to use, as the abelian surface $A_0$, a genus-2 curve corresponding to the abelian surface $A_0$.

5. The cryptographic system according to claim 3, wherein the genus-2 curve corresponds to a portion adjacent to a portion decomposed into a direct product of an elliptic curve $E_0$ out of portions not decomposed into the direct product of the elliptic curve $E_0$ in the abelian surface $A_0$.

6. The cryptographic system according to claim 4, wherein the genus-2 curve corresponds to a portion adjacent to a portion decomposed into a direct product of an elliptic curve $E_0$ out of portions not decomposed into the direct product of the elliptic curve $E_0$ in the abelian surface $A_0$.

7. The cryptographic system according to claim 1, wherein the processing circuitry is configured to use, as the abelian surface $A_0$, a portion decomposed into a direct product of an elliptic curve $E_0$ in the abelian surface $A_0$.

8. The cryptographic system according to claim 2, wherein the processing circuitry is configured to use, as the abelian surface $A_0$, a portion decomposed into a direct product of an elliptic curve $E_0$ in the abelian surface $A_0$.

9. The cryptographic system according to claim 5, wherein the elliptic curve $E_0$ is $E_0/F_p:y^2=x^3+x$ when a remainder of dividing a prime number p by 4 is 3, or $E_0/F_p:y^2=x^3+c$ when the remainder of dividing the prime number p by 4 is 1, where c is a constant, and $F_p$ is a field modulo a prime number p.

10. The cryptographic system according to claim 6, wherein the elliptic curve $E_0$ is $E_0/F_p:y^2=x^3+x$ when a remainder of dividing a prime number p by 4 is 3, or $E_0/F_p:y^2=x^3+c$ when the remainder of dividing the prime number p by 4 is 1, where c is a constant, and $F_p$ is a field modulo a prime number p.

11. The cryptographic system according to claim 7, wherein the elliptic curve $E_0$ is $E_0/F_p:y^2=x^3+x$ when a remainder of dividing a prime number p by 4 is 3, or $E_0/F_p:y^2=x^3+c$ when the remainder of dividing the prime number p by 4 is 1, where c is a constant, and $F_p$ is a field modulo a prime number p.

12. The cryptographic system according to claim 8, wherein the elliptic curve $E_0$ is $E_0/F_p:y^2=x^3+x$ when a remainder of dividing a prime number p by 4 is 3, or $E_0/F_p:y^2=x^3+c$ when the remainder of dividing the prime number p by 4 is 1, where c is a constant, and $F_p$ is a field modulo a prime number p.

13. An encryption device in a cryptographic system to perform a cryptographic process in which a Richelot isogeny sequence $\varphi_s$ includes a first starting point and a first end point, the first starting point being an abelian surface $A_0$ and the first end point being an abelian surface $A_s$ the abelian surface $A_0$ being a first secret key and the abelian surface $A_s$ being a first public key, the encryption device comprising
processing circuitry configured to compute an abelian surface $A_m$ by transitioning the abelian surface $A_s$, the abelian surface $A_s$ being the first public key, by a Richelot isogeny sequence $\varphi_m$ generated by encoding a plaintext m, and set the abelian surface $A_m$ as a ciphertext.

14. A decryption device in a cryptographic system to perform a cryptographic process in which a Richelot isogeny $\varphi_s$ includes a first starting point and a first end point, the first starting point being an abelian surface $A_0$ and the first end point being an abelian surface $A_s$ the abelian surface $A_0$ being a first secret key and the abelian surface $A_s$ being a first public key, the decryption device comprising
processing circuitry configured to:
acquire a ciphertext that is an abelian surface $A_m$ computed by transitioning the abelian surface $A_s$, the abelian surface $A_s$ being a first public key, by a Richelot isogeny sequence $\varphi_m$ generated by encoding a plaintext m; and
compute a Richelot isogeny $\varphi_m$ with a second start point and a second end point, the second starting point being the abelian surface $A_s$, the abelian surface $A_s$ being a second public key, and the second end point is the abelian surface $A_m$, the abelian surface $A_m$ being the ciphertext, based on the Richelot isogeny sequence $\varphi_s$, the Richelot isogeny sequence $\varphi_s$ being a second secret key.

15. A key generation device comprising processing circuitry configured to:
acquire an abelian surface $A_0$, which is a public parameter;
compute a Richelot isogeny $\varphi_0$ of the acquired abelian surface $A_0$ to compute an abelian surface $A_1$, and compute a Richelot isogeny $\varphi_i$ to compute an abelian surface $A_{i+1}$ by rearranging zero points of the abelian surface $A_i$ for each integer i of i=1, . . . , κ−1 in ascending order, using an integer κ of 2 or more; and
set a computed abelian surface $A_κ$ as a public key, and set a Richelot isogeny sequence that is a set of Richelot isogenies $\varphi_i$ for integers i of i=0, . . . , κ−1 as a secret key.

\* \* \* \* \*